United States Patent [19]
Taniguchi

[11] Patent Number: 5,392,279
[45] Date of Patent: Feb. 21, 1995

[54] INTERCONNECTION NETWORK WITH SELF-ROUTING FUNCTION

[75] Inventor: Kenji Taniguchi, Kawasaki, Japan

[73] Assignee: Fujitsu Limited, Kanagawa, Japan

[21] Appl. No.: 4,996

[22] Filed: Jan. 15, 1993

[30] Foreign Application Priority Data

Jan. 17, 1992 [JP] Japan .................. 4-006546

[51] Int. Cl.$^6$ ............................. H04Q 11/04
[52] U.S. Cl. ........................................ 370/60
[58] Field of Search ............ 370/60, 60.1, 58.1, 370/94.1, 94.3, 56, 112, 58.2, 58.3, 59, 61, 63, 64, 65, 65.5; 340/825.5, 825.79, 825.8

[56] References Cited

U.S. PATENT DOCUMENTS

| | | | |
|---|---|---|---|
| 4,817,084 | 3/1989 | Arthurs et al. | 370/60 |
| 4,866,701 | 9/1989 | Giacopelli et al. | 370/60 |
| 4,893,304 | 1/1990 | Giacopelli et al. | 370/60 |
| 5,065,394 | 11/1991 | Zhang | 370/60 |
| 5,130,976 | 7/1992 | Hickey et al. | 370/96.1 |

FOREIGN PATENT DOCUMENTS

| | | |
|---|---|---|
| 1109939 | 4/1989 | Japan . |
| 254653 | 2/1990 | Japan . |
| 360247 | 3/1991 | Japan . |
| 3159338 | 7/1991 | Japan . |
| 443738 | 2/1992 | Japan . |
| 0004015 | 10/1984 | WIPO ................ 370/60 |

OTHER PUBLICATIONS

William Stallings, "Data and Computer Communications", 1988 pp. 215–217.

Primary Examiner—Douglas W. Olms
Assistant Examiner—Huy D. Vu

[57] ABSTRACT

The present invention provides an interconnection network with a self-routing function which is suitable for use with an ATM exchange and can effect routing processing in a reduced latency while assuring a function equivalent to that of a conventional Batcher-banyan network. The interconnection network comprises $2^i$ N/$2^i$-input N-output Batcher-banyan networks connected in parallel to each other and each including a Batcher sorting network, comparison/blocking means, concentration means and a banyan network.

11 Claims, 17 Drawing Sheets

FIG.8
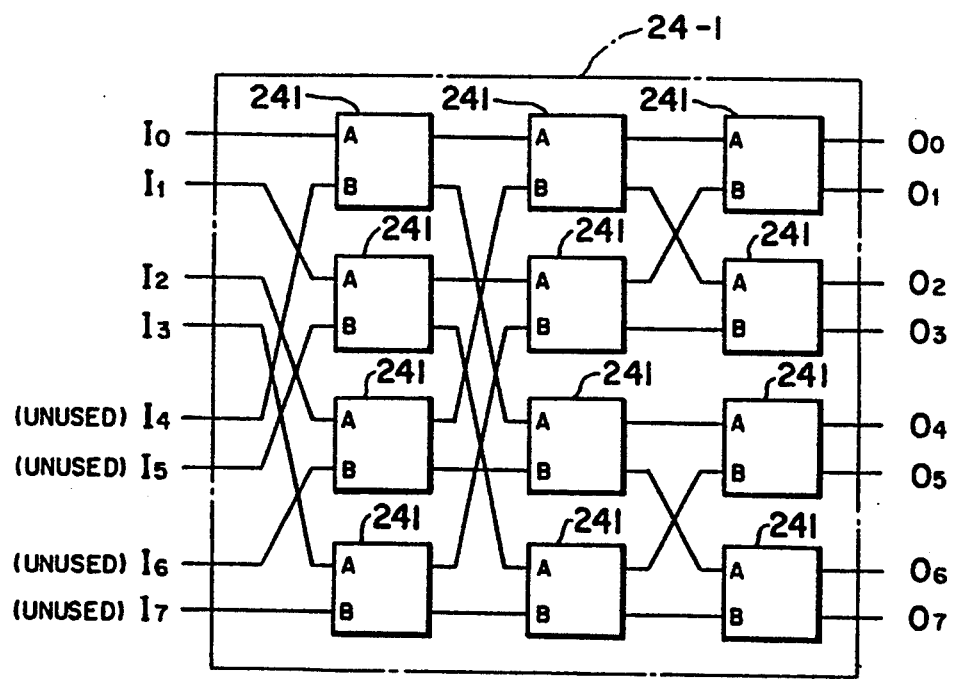
FIG.9(a)  FIG.9(b)  FIG.9(c)
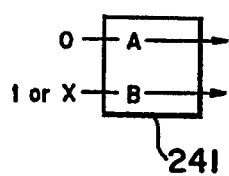 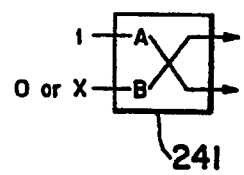 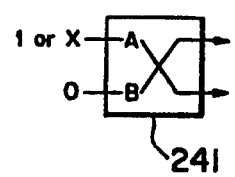
FIG.9(d)  FIG.9(e)
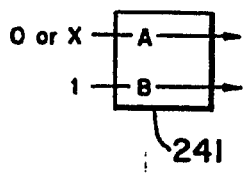 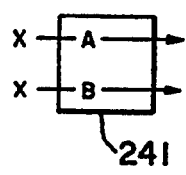
X: INACTIVE CELL FIG.12(b) SYSTEM CLOCK 
FIG.12(c) CLK 
FIG.12(d) RESET 
FIG.12(e) ACT BIT TIMING 
DA : DESTINATION ADDRESS
SA : SOURCE ADDRESS
ACT : ACTIVITY BIT
       0: INACTIVE  1: ACTIVE

INTERCONNECTION NETWORK WITH SELF-ROUTING FUNCTION

BACKGROUND OF THE INVENTION

This invention relates to an interconnection network with a self-routing function suitable for use with an ATM exchange.

The demand for higher speed, broader band communication networks has been and is increasing, and much attention is paid to an asynchronous transmission mode (ATM) as a communication system of the next generation. Thus, an interconnection network which has a self-routing function to effect autonomous routing by hardware and is anticipated to achieve a high speed operation is considered promising as means to realize an ATM exchange.

However, in a Batcher-banyan network which is one of interconnection networks of the self-routing type, the latency by routing processing depends upon the numbers of stages of the Batcher sorting network and the banyan routing network. Consequently, realization of an interconnection network of the self-routing type which is more suitable for an ATM exchange and has a reduced number of stages, that is, has a reduced latency is demanded.

FIG. 20 is a block diagram showing a Batcher-banyan network. Referring to FIG. 20, the Batcher-banyan network 70 shown has a self-routing function with N ($N=2^n$, n is a natural number) input and output lines. The Batcher-banyan network 70 includes a Batcher sorting network 71, a comparison/blocking circuit 72, a concentration circuit 73, and a banyan network 74.

The Batcher sorting network 71 has N inputs and N outputs and is constituted from $n(n+1)/2$ stages ($n=\log_2 N$). The Batcher sorting network 71 effects sorting of cells.

The comparison/blocking circuit 72 has N inputs and N outputs and compares addresses of cells sorted by the Batcher sorting network 71 to block inactive cells.

The concentration circuit 73 has N inputs and N outputs and compensates for blocked cells and then concentrates the cells.

The banyan network 74 has N inputs and N outputs and outputs listed cells to the corresponding output lines based on destination address information of the cells.

In the Batcher-banyan network 70 of the construction described above, inputted cells are rearranged based on the magnitude of destination address information of them (such re-arrangement will be hereinafter referred to as sorting) by the Batcher sorting network 71. As a result of the sorting, those cells having an identical destination address are listed continuously.

Then, the comparison/blocking circuit 72 compares the addresses of the cells and leaves only one of those cells having an Identical address while purging the remaining Cells (such purging will be hereinafter referred to as blocking). Then, when blocking of cells is performed, the list of the cells is discontinuous, and therefore, the cells are passed through the concentration circuit 73 to pack them so that they may be listed continuously.

The sequence of the cells sorted based on the destination addresses thereof and packed into the continuous list In this manner are inputted to the banyan network 74. The banyan network 74 thus outputs the cells to the output lines thereof corresponding to the destination addresses (this will be hereinafter described as routing).

In such an interconnection network with a self-routing function as described above, however, the number of stages, upon which the latency by routing processing depends, is a total of $n(n+3)/2$ stages with the Batcher sorting network and the banyan network.

Accordingly, If it is assumed that the processing time per one bit of information is represented as 1 bit-time, then the processing time of 1 bit-time is required per one stage. Accordingly, in the Batcher sorting network and the banyan network, the processing time of a total of $n(n+3)/2$ bit-times is required, and this occupies a larger part of the latency.

Therefore, when a Batcher-banyan network is applied to an ATM exchange for use for high speed broad band communication, since conventional Batcher-banyan networks have a comparatively large number of stages, they have a subject to be solved that the latency by routing processing is long.

SUMMARY OF THE INVENTION

It is an object of the present invention to provide an interconnection network with a self-routing function which can effect routing processing in a reduced latency while keeping an equivalent function to that of conventional Batcher-banyan networks.

In order to attain the object, according to the present invention, there is provided an interconnection network with a self-routing function which has N input lines and N output lines, N being a natural number equal to $2^n$, n being a natural number, and effects autonomous routing of a cell, which is an information communication unit, based on destination address information of the cell, which comprises $2^i$ $N/2^i$-input N-output Batcher-banyan networks connected in parallel to each other, i being a natural number, each of the $N/2^i$-input N-output Batcher-banyan networks including a Batcher sorting network having $N/2^i$ inputs and $N/2^i$ outputs and including $(n-i)(n+1-i)/2$ stages for sorting input cells, n being equal to $\log_2 N$, comparison/blocking means having $N/2^i$ inputs and $N/2^i$ outputs for comparing addresses of the cells sorted by the Batcher sorting network and leaving only one of those cells which have an identical address while blocking the remaining one or ones of those cells, concentration means having $N/2^i$ inputs and $N/2^i$ outputs for compensating for the cell or cells blocked by the comparison/blocking means to pack the cells so that the list of them may be continuous, and a banyan network having N inputs and N outputs for outputting the cells outputted from the concentrating means to the corresponding output lines based on the address information of the cells.

The comparison/blocking means may include comparing means for comparing addresses of adjacent input cells, and blocking means for blocking those cells except one which are determined by the comparing means that they have an identical address.

Preferably, the blocking means effects blocking processing by making the cell activity bit or bits in the remaining cell or cells except the one cell inactive. The blocking means may include a latch circuit for latching a result of comparison from the comparing means, a gate circuit for receiving an output of the latch circuit and an input cell and outputting cell activity bit information or cell inactivity bit information, and a selector for inserting an output of the gate circuit into the cell at a timing of a position in the cell at which the cell activity bit is inserted.

The concentration means may include discrimination means for discriminating whether a cell inputted thereto by way of the comparison/blocking means is active or inactive, and cell packing means for packing, based on a result of discrimination at the discrimination means, the cells so that the list of the cells may be continuous.

In this instance, the discrimination means may include a latch circuit for latching cell activity bit information in the cell, and the cell packing means includes a set of selectors for packing, based on a result of discrimination from the latch circuit, the cells so that the list of the cells may be continuous.

Preferably, the $N/2^i$ outputs of the concentration circuit of each of the N/2-input N-output Batcher-banyan networks are inputted as part of the N inputs of the banyan network in order beginning with an end one, and the remaining inputs of the banyan network remain in an unconnected condition.

Preferably, the interconnection network with a self-routing function further comprises an output interface for inputting the individual N outputs of the $N/2^i$-input N-output Batcher-banyan networks and outputting N outputs.

In this instance, the output interface may include queueing buffer circuits provided for the output lines thereof for receiving the individual N outputs of the $N/2^i$-input N-output Batcher-banyan networks.

The output interface may include arbitration means provided individually for the output lines thereof for receiving the individual N outputs of the $N/2^i$-input N-output Batcher-banyan networks and selecting, when different cells arrive in an overlapping relationship at a same output, one of the cells while blocking the other cell or cells. In this instance, the arbitration means may be individually constructed such that they receive the individual N outputs of the $N/2^i$-input N-output Batcher-banyan networks and selecting, when different cells arrive in an overlapping relationship at a same output, the output of a particular one of the $N/2^i$-input N-output Batcher-banyan networks while blocking the other output or outputs. Further, in this instance, the arbitration means may include discrimination means for discriminating presence of a cell from the particular $N/2^i$-input N-output Batcher-banyan network, and a selector for preferentially selecting, when a cell from the particular $N/2^i$-input N-output Batcher-banyan network is present based on a result of discrimination at the discrimination means, the output of the particular $N/2^i$-input N-output Batcher-banyan network.

With the interconnection network with a self-routing function, when the numbers of the inputs and the outputs are N, the number of stages is reduced by $i(2n+1-i)/2$ comparing with conventional Batcher-banyan networks, and consequently, the latency by routing processing can be reduced by $i(2n+1-i)/2$ bit-times. Further, since a plurality of cells can be routed at a time, the cell blocking ratio can be improved by forming queues on the output side of the interconnection network. Further, since the interconnection network is constructed such that a plurality of circuit systems are connected in parallel to each other, an influence when a trouble occurs can be restricted to a comparatively small range, which significantly contributes to enhancement of the performance and the practical use of the interconnection network when it is applied to a communication network.

Further objects, features and advantages of the present invention will become apparent from the following detailed description when read in conjunction with the accompanying drawings In which like parts or elements are denoted by like reference characters.

BRIEF DESCRIPTION OF THE DRAWINGS

FIG. 8 is a block diagram showing detailed construction of the banyan network;

FIGS. 9(a) to 9(e) are diagrammatic views illustrating operation of a switching element constituting the banyan network:

FIGS. 12(a) to 12(e) are time charts showing a cell format.

DESCRIPTION OF THE PREFERRED EMBODIMENTS a. First Embodiment

Figure 1:
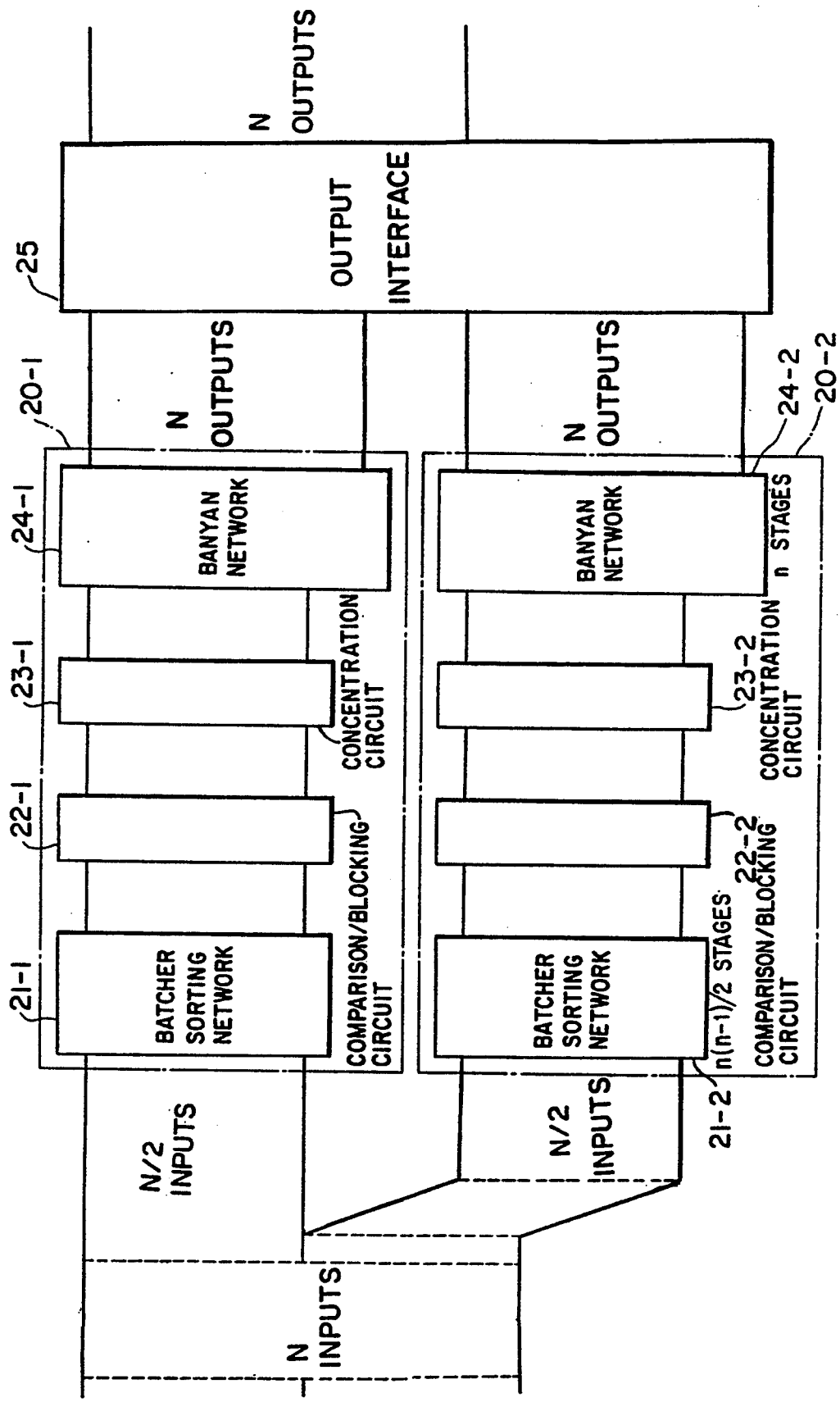
FIG. 1 is a block diagram of an interconnection network showing a first preferred embodiment of the present invention.

Referring first to FIG. 1, there is shown an interconnection network according to a first preferred embodiment of the present invention. The interconnection network shown includes a pair of N/2 -input N-output Batcher-banyan networks 20-1 and 20-2. The N/2 -input N-output Batcher-banyan networks 20-1 and 20-2 have a self-routing function and are connected in parallel to each other. Each of the Batcher-banyan networks 20-1 and 20-2 includes a Batcher sorting network 21-1 or 21-2, a comparison/blocking 22-1 or 22-2, a concentration circuit 23-1 or 23-2, and a banyan network 24-1 or 24-2. Here, $N=2^n$, where n is a natural number.

Figure 2:
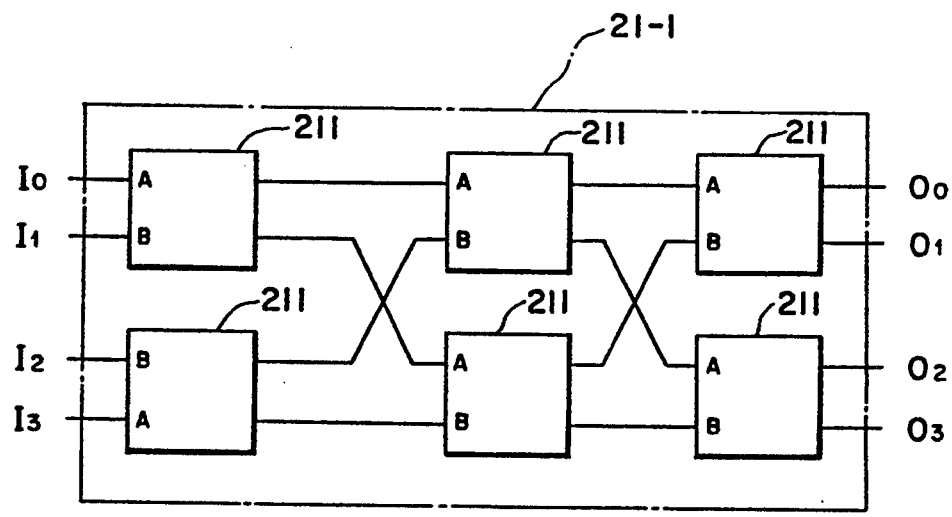
FIG. 2 is a block diagram showing detailed construction of a Batcher sorting network of the interconnection network.

The Batcher sorting network 21-1 has N/2 inputs and N/2 outputs and is constituted from $n(n-i)/2$ ($n=\log_2 N$) stages. The Batcher sorting network 21-1 effects sorting of cells. When the Batcher sorting network 21-1 has, for example, four inputs and four outputs (4×4, N=8), it has such a configuration as shown in FIG. 2. In particular, referring to FIG. 2, the 4×4 Batcher sorting network 21-1 is constituted from three stages each constituted from two 2×2 (2-input 2-output) switching elements 211.

Figure 3A:
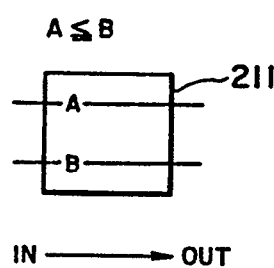
FIGS. 3(a) and 3(b) are diagrammatic views illustrating operation of a switching element constituting the Batcher sorting network.
Figure 3B:
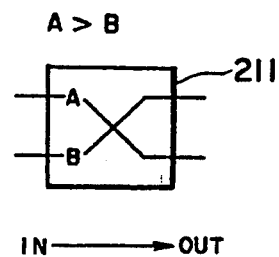
Figure 12A:
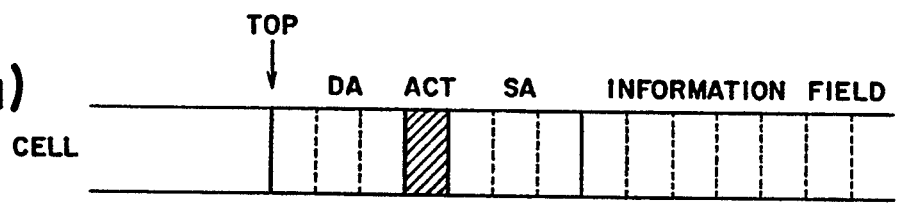

Here, each switching element 211 compares destination addresses DA (refer to the waveform (a) of FIG. 12) of input cells inputted to an input terminal A and another input terminal B thereof, and when the address DA of the cell inputted to the input terminal A is equal to or smaller than -the address DA of the cell inputted to the input terminal B (depicted A≦B), the inputted cells are outputted straightforwardly as shown in FIG. 3(a). On the other hand, when the address DA of the cell inputted to the input terminal A is larger than the address DA of the cell inputted to the input terminal B (depicted A>B), the input cells are outputted in a crossed condition as shown in FIG. 3(b).

Figure 13:
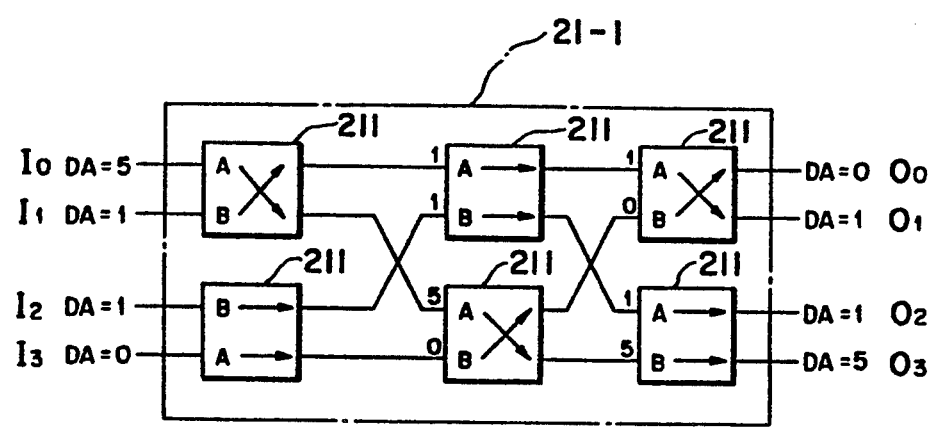
FIG. 13 is a block diagram illustrating operation of the Batcher sorting network.

By connecting the switching elements 211, which individually operate in such a manner as described above, in such a manner as shown in FIG. 2, the 4×4 Batcher sorting network 21-1 can output cells inputted by way of input lines $I_0$ to $I_3$ thereto in order having smaller addresses (refer to FIG. 13).

Referring back to FIG. 1, the comparison/blocking circuit 22-1 has N/2 inputs and N/2 outputs and compares n-bit destination addresses of cells sorted by the Batcher sorting network 21-1. If the comparison reveals that different cells have an identical destination address, the comparison/blocking circuit 22-1 leaves only one of the cells while blocking the remaining cell or cells.

Figure 4:
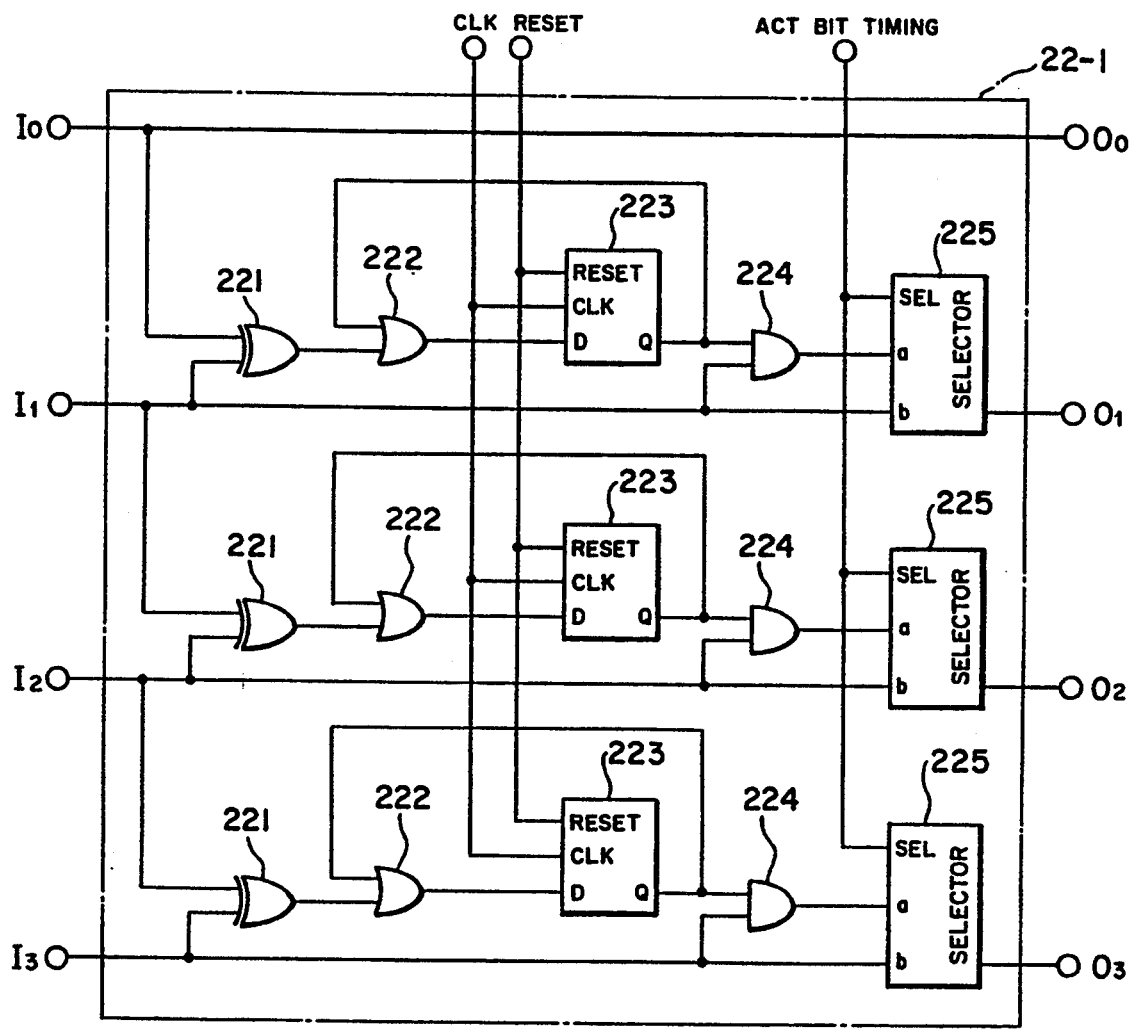
FIG. 4 is a block diagram showing detailed construction of a comparison/blocking circuit of the interconnection network.

In particular, when the comparison/blocking circuit 22-1 is of the 4-input type, it includes, as shown in FIG. 4, three exclusive OR circuits 221 individually connected between adjacent ones of the input lines, three OR gates 222, three latch circuits 223, three AND circuits 224 and three selectors 225 in order to effect comparison and blocking processing between the adjacent input lines.

Here, each of the exclusive OR circuits 221 receives signals from two adjacent input lines and compares them to check whether the destination addresses of the inputted cells are identical with each other, and outputs the "0" output if they are identical with each other, but outputs the "1" output if they are different from each other. The exclusive OR circuits 221 thus constitute comparing means for comparing tile destination addresses of input cells.

Each of the OR gates 222 logically ORs the output of a corresponding one of the exclusive OR circuits 221 and the output of a corresponding one of the latch circuits 223 and supplies the output thereof to the data input terminal (D input terminal) of the corresponding latch circuit 223.

Each of the latch circuits 223 is formed from a D-type flip-flop and receives, at the D input terminal thereof, the output of the corresponding OR gate 222 and, at the reset terminal thereof, a reset signal (refer to the waveform (d) of FIG. 12), and further at the clock input terminal thereof, a clock signal (refer to the waveform (c) of FIG. 12). The output of the latch circuit 223 is fed back to the input of the corresponding OR gate 222 and also inputted to a corresponding one of the AND gates 224. Consequently, the latch circuit 223 can latch a result of comparison at the exclusive OR circuit 221.

It is to be noted that the clock signal is synchronized with a system clock shown by the waveform (b) in FIG. 12.

Each of the AND gates 224 logically ANDs the output of the corresponding latch circuit 223 and a signal from that one of a corresponding pair of adjacent input lines which has a greater input line number, and inputs the output thereof to a corresponding one of the selectors 225.

Figure 5A:
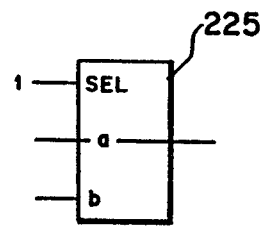
FIGS. 5(a) and 5(b) are diagrammatic views illustrating operation of a selector constituting the comparison/blocking circuit.
Figure 5B:
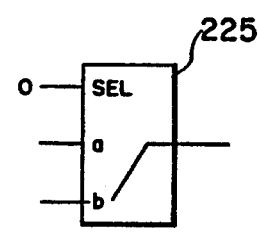

The selector 225 receives, at an input terminal a thereof, the output of the corresponding AND gate 224 and, at another input terminal b thereof, a signal from that one of a corresponding pair of adjacent input lines which has a greater input line number, and outputs the signal received at the input terminal a thereof when the ACT bit timing signal (refer to the waveform (e) in FIG. 12: the signal presents the value "1" at a position of a cell at which an ACT bit (cell activity bit information) is inserted, but otherwise presents the value "0" as can be seen from FIG. 12) is "1" (refer to FIG. 5(a)), but outputs the signal received at the other input terminal b thereof when the ACT bit timing signal is "0" (refer to FIG. 5(b)).

Thus, if the addresses of the cells of two adjacent input lines are identical with each other, then the latch circuit 223 outputs "0", but if the addresses are different from each other, then the latch circuit 223 outputs "1". Accordingly, it can be seen that the output of the AND gate 224 at the position at which an ACT bit is inserted is "0" if the addresses of the cells of the corresponding adjacent input lines are identical with each other, but if the addresses are different from each other, the output of the AND gate 224 is "1". Since the selector 225 outputs the signal received at the input terminal a thereof when the ACT bit timing signal is "1", the cell outputted from the selector 225 is, when the addresses of the corresponding adjacent cells are identical with each other, replaced Into "0" at the position thereof at which the ACT bit is inserted, but when the addresses of the corresponding adjacent cells are different from each other and the ACT bit is "1", the cell outputted from the selector 225 remains equal to "1" at the position thereof at which the ACT bit is inserted.

In this manner, when the cell at the position at which an ACT bit is inserted is "0", it is thereafter handled as a blocked cell.

Consequently, each of the AND gates 224 constitutes a gate circuit which receives the output of the corresponding latch circuit 223 and the input cell and outputs cell activity bit information or cell inactivity bit information, and each of the selectors 225 constitutes a circuit which inserts the output of the corresponding AND gate 224 into a cell at the timing of a position in the cell at which a cell activity bit is inserted.

Figure 14:
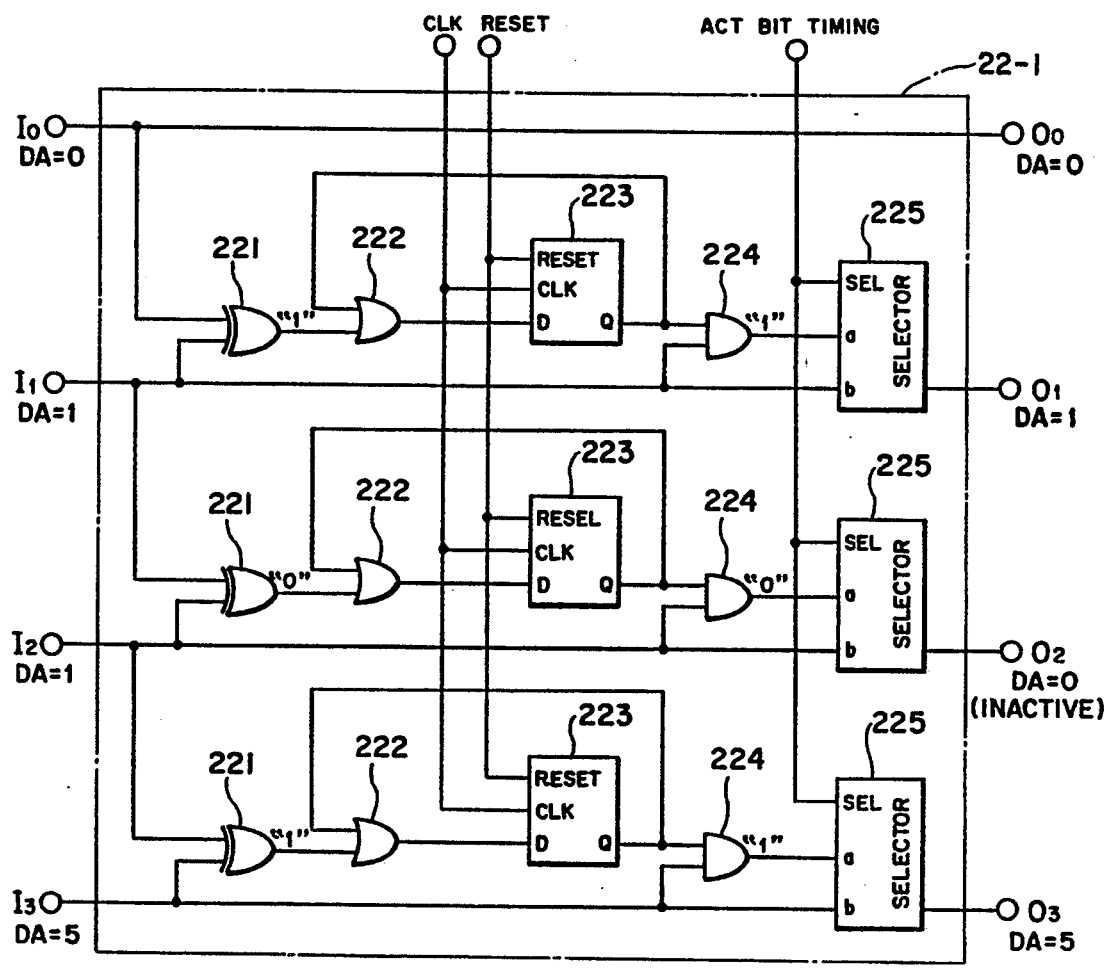
FIG. 14 is a block diagram illustrating operation of the comparison/blocking circuit.

When the addresses DA of cells corresponding to the input lines $I_0$ to $I_3$ are, for example, 0, 1, 1 and 5, respectively, as shown in FIG. 14, the exclusive OR circuits 221 between the input lines $I_0$ and $I_1$ and the input lines $I_2$ and $I_3$ output "1" while the exclusive OR circuit 221 between the input lines $I_1$ and $I_2$ outputs "0". Consequently, the selectors 225 for the input lines $I_1$ and $I_3$ maintain the value "1" at the positions of the cells at which ACT bits are inserted, but the selector 225 for the input line $I_2$ replaces the value at the position of the cell at which an ACT bit is inserted into "0". As a result, the cells from the output lines $0_0$, $0_1$ and $0_3$ are outputted as active cells while the cell from the output line $O_2$ is outputted as an inactive cell.

Figure 6:
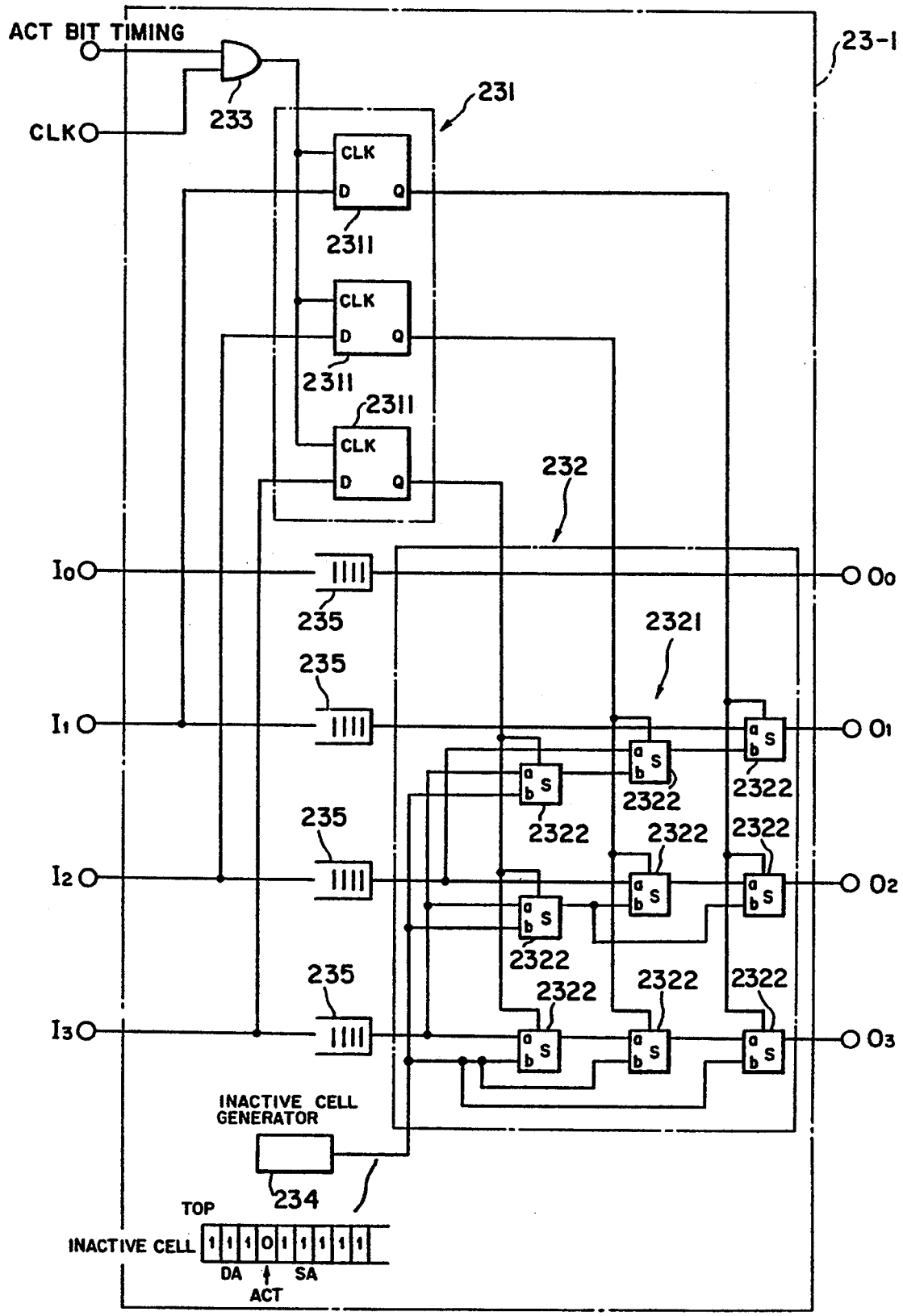
FIG. 6 is a block diagram showing detailed construction of a concentration circuit of the interconnection network.

Referring back to FIG. 1, the concentration circuit 23-1 has N/2 inputs and N/2 outputs and cuts a cell or cells in the comparison/blocking means 22-1 so as to pack the cells so that they may be present continuously in a list. To this end, the concentration circuit 23-1 includes, as shown in FIG. 6, a discrimination circuit 231 for discriminating whether cells inputted thereto by way of the comparison/blocking circuit 22-1 are active or inactive, and a cell packing circuit 232 for packing, based on results of discrimination at the discrimination circuit 231, the cells so that the cells may be present continuously in a list.

Where the concentration circuit 23-1 is, for example, of the four input type, as shown in FIG. 6, the discrimination circuit 231 is constituted from three latch circuits 2311 to 2313 for latching cell activity bit information in cells, and the cell packing circuit 282 is constituted from a selector set 2321 for packing, based a result of discrimination from the latch circuits 2311 to 2313, the cells so that the cells may be present continuously in a list.

Here, the latch circuits 2311 to 2313 are each formed from a D-type flip-flop and receive, at the D input terminals thereof, signals of the input lines $I_1$ to $I_3$, respectively, and, at the clock input terminals thereof, a logical AND signal (output of an AND gate 233) of a clock signal (refer to the waveform (c) of FIG. 12) and an ACT bit timing signal (refer to the waveform (e) of FIG. 12). The outputs of the latch circuits 2311 to 2313 are inputted to selectors 2322 which constitute the selector set 2321. Consequently, each of the latch circuits 2311 to 2313 latches cell activity bit information in a cell and, if the cell has not been processed for inactivity, outputs a selector signal "1" to the corresponding selectors 2322, but if the cell has been processed for inactivity, outputs another selector signal "0" to the corresponding selectors 2822.

The selectors 2322 constituting the selector set 2321 are disposed in the following manner. In particular, no selector is involved in the line corresponding to the input line $I_0$, but three selectors 2322 are provided on the line corresponding to each of the input lines $I_2$ to $I_3$. Each of the selectors 2322 outputs the signal received at an input terminal a thereof when the output of a corresponding one of the latch circuits 2311 to 2313 is "1", but outputs the signal received at another input terminal b thereof when the output of the corresponding latch circuit 2211, 2312 or 2313 is "0".

Accordingly, when that one of each pair of adjacent input lines which has a smaller input line number has been processed for inactivity (the ACT bit thereof is "0"), the other input line which has a larger input line number and whose cell is active (the ACT bit is "1") is outputted from an output line corresponding to the input line having the smaller input line number.

Figure 15:
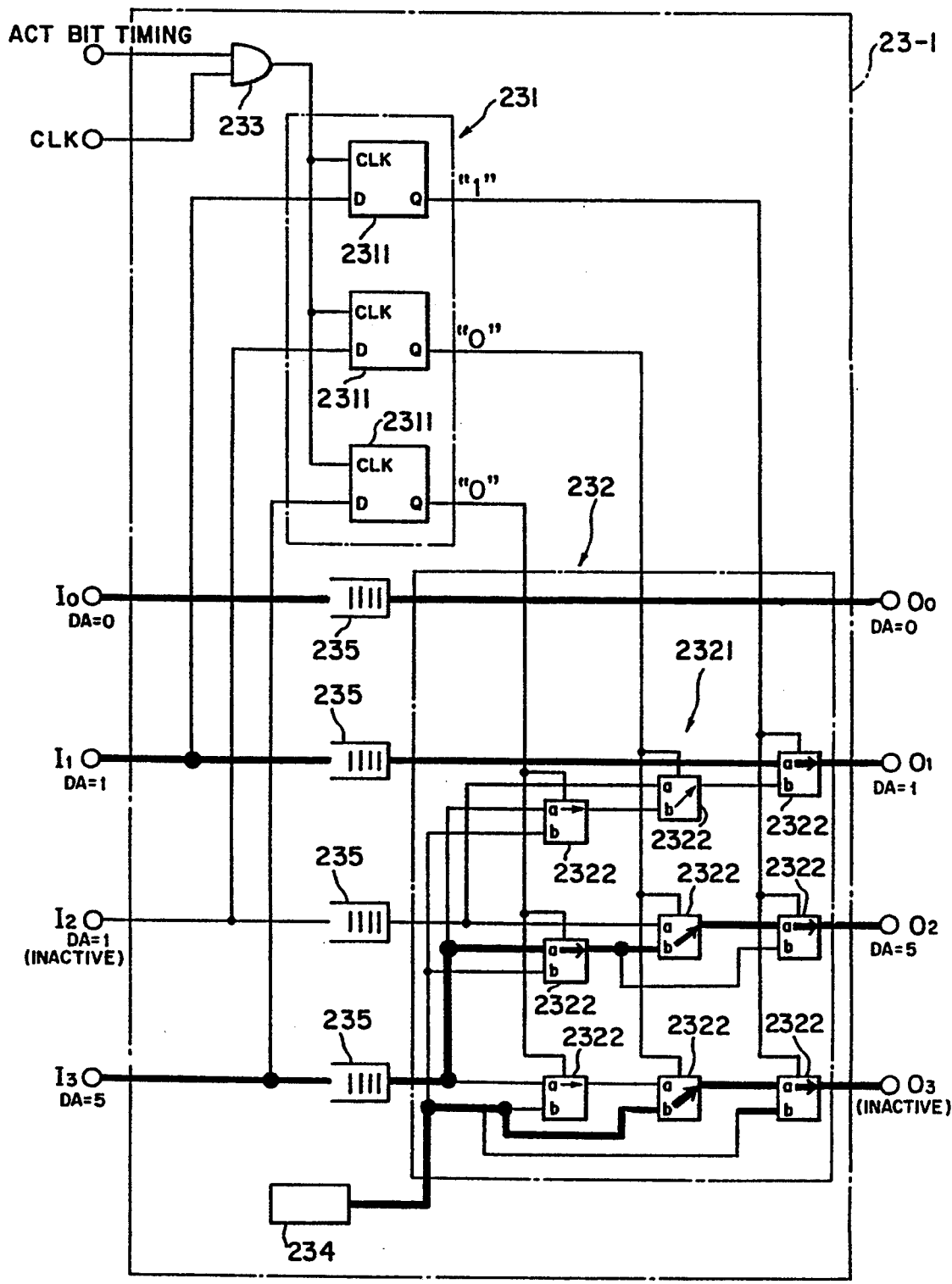
FIG. 15 is a block diagram illustrating operation of the concentration circuit.

For example, when the cells at the input lines $I_1$ and $I_2$ have an identical address as shown in FIG. 15 and accordingly the cell at the input line $I_2$ has been processed for Inactivity, while the cells at the input lines $I_2$ to $I_1$ are outputted from the corresponding output lines $O_0$ and $O_1$, respectively, as indicated by thick lines in FIG. 15, the cell at the input line $I_2$ is cut intermediately at one of the selectors 2322 and the cell at the input line $I_3$ is outputted from the output line $O_2$ corresponding to the input line $I_3$. In particular, the selectors 2322 provided in each line are higher in priority toward the output line side and decrease in priority far away from the output line side. Consequently, cells are packed to the smaller input line number side into a list.

It is to be noted that, since the list of cells is packed to the smaller input line number side, an inactive cell or cells must be outputted from an output line or lines corresponding to an input line or lines having a larger input line number or numbers. To this end, an inactive cell generator 234 is provided as shown in FIG. 6. Due to the provision of the inactive cell generator 234, in the example described above, an inactive cell is outputted from the output line $O_3$ corresponding to the input line $I_3$ (refer to FIG. 15).

It is to be noted that, in FIG. 6, reference numeral 235 denotes a buffer for causing a cell to wait till the position of the ACT bit.

Figure 7:
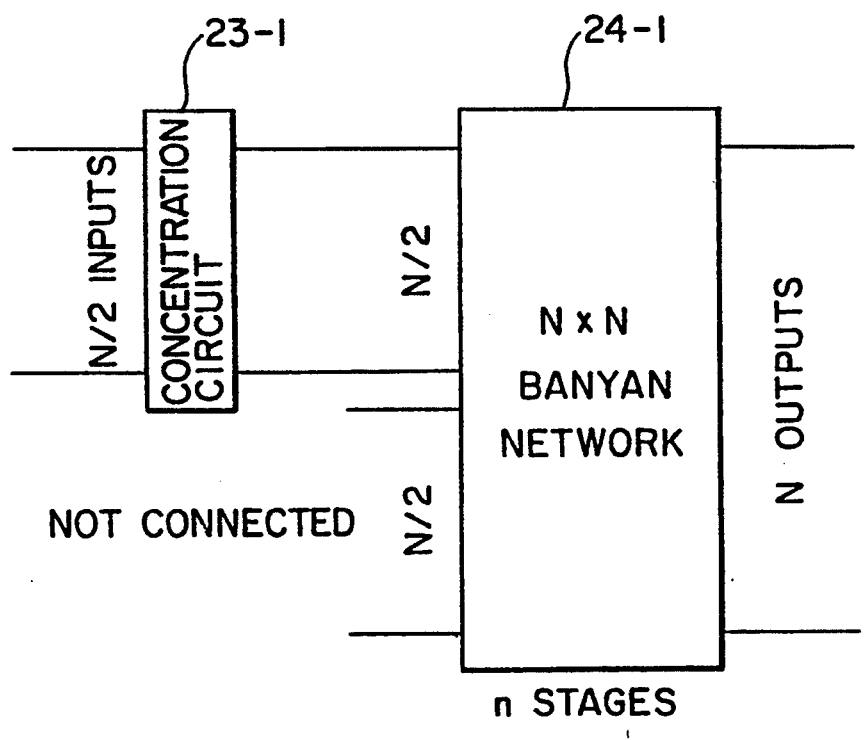
FIG. 7 is a block diagram illustrating a connection between the concentration circuit and the banyan network of the interconnection network.

Referring now to FIG. 7, the banyan network 24-1 has N inputs and N outputs. The N/2 outputs of the concentration circuit 23-1 are connected to those successive N/2 inputs of the banyan network 24-1 beginning with an end one of the N inputs in a row, and the remaining N/2 inputs of the banyan network 24-1 remain in an unconnected condition. The banyan network 24-1 thus outputs information based on address information of the successively listed cells from the concentration circuit 23-1 to the output lines thereof.

When the banyan network 24-1 is formed as an 8×8 (N=8) banyan network, it has such a configuration as shown in FIG. 8. Referring to FIG. 8, the 8×8 banyan network 24-1 shown is constituted from three stages each constituted from four 2×2 switching elements 241.

Here, each of the switching elements 241 operates depending upon allotted check bits of the destination addresses DA (refer to the waveform (a) of FIG. 12) of the input cells inputted to input terminals A and B thereof, and it exhibits such conditions as illustrated In FIGS. 9(a) to 9(e) depending upon the combination of the check bits at the Input terminals A and B thereof. It is to be noted that x depicts a check bit of an Inactive cell.

Further, the check bit In different bits of a destination address DA is different among the different stages. For example, at the first stage, the first bit of the destination address DA is employed as the check bit; at the second stage, the second bit of the destination address DA is employed as the check bit; and at the third stage, the third bit of the destination address DA is employed as the check bit (refer to FIG. 16).

Figure 16:
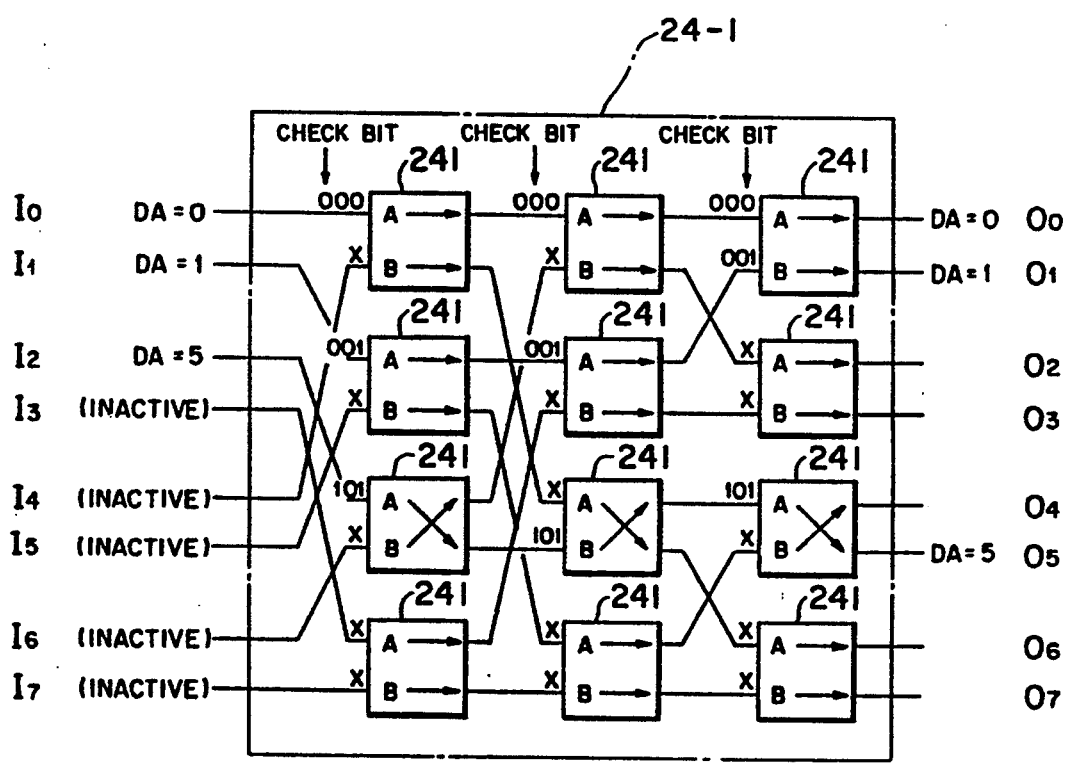
FIG. 16 is a block diagram illustrating operation of the banyan network.

Consequently, if, for example, the destination address DA of "0" is inputted to the input line $I_0$; the destination address DA of "1" is inputted to the input line $I_1$; the destination address DA of "5" is inputted to the input line $I_2$: and inactive cells are inputted to the input lines $I_3$ to $I_7$, then the 8×8 banyan network 24-1 operates in such a manner as illustrated in FIG. 16. It can be seen from FIG. 16 that the successively listed cells from the concentration circuit 23-1 are outputted to the corresponding output lines $O_0$, $O_1$ and $O_5$ based on the destination address information thereof.

Referring back to FIG. 1, also the Batcher sorting network 21-2, the comparison/blocking circuit 22-2, the concentration circuit 23-2 and the banyan network 24-2 of the other N/2-input N-output Batcher-banyan network 20-2 are constructed and operate similarly to the Batcher sorting network 21-1, the comparison/blocking circuit 22-1, the concentration circuit 23-1 and the banyan network 24-1 of the N/2-input N-output Batcher-banyan network 20-1, respectively.

The two N/2-input N-output Batcher-banyan networks 20-1 and 20-2 are connected such that, as shown in FIG. 1, the inputs thereof are connected so as to cover all of the N-input lines and the outputs thereof are connected to the output lines by way of an output interface 25 such that, taking such a case into consideration that different cells arrive in an overlapping relationship at a same output line, each two outputs allotted to a same destination are coupled to a same output line.

Figure 10:
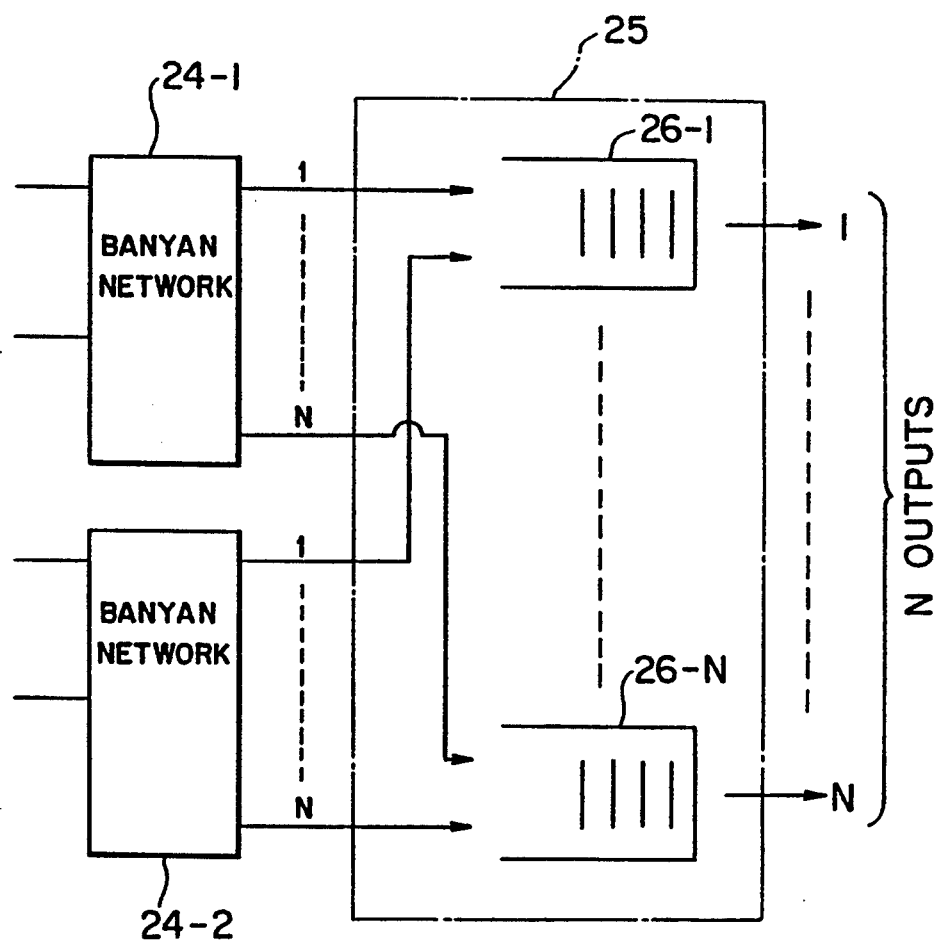
FIG. 10 is a block diagram showing an output interface including queueing buffers.

In particular, the output interface 25 inputs the individual N inputs, that is, a total of 2N inputs, of the two N/2-input N-output Batcher-banyan networks 20-1 and 20-2 and outputs N outputs. The output interface 25 is constructed, for example, in such a manner as shown In FIG. 10 that it includes queueing buffer circuits 26-1 to 26-N for the individual output lines. Here, each of the buffer circuits 26-1 to 26-N receives a pair of outputs one from each of the N/2-input N-output Batcher-banyan networks 24-1 and 24-2, and the buffer circuits 26-1 to 26-N form such queues that maintain cells until they are serviced.

It is to be noted that it is otherwise possible to provide, as such output interface 25, for each output line, an arbitration circuit which selects, when two cells arrive in an overlapping relationship at the output line, one of the two cells and blocks the other cell.

The arbitration circuits are provided for the individual output lines and are constructed as arbitration circuits 27-1 to 27-N which each receives, for example, a pair of outputs one from each of the two N/2-input N-output Batcher-banyan networks 20-1 and 20-2 and selects, when two different cells arrive in an overlapping relationship to a same output, the output of the particular N/2-input N-output Batcher-banyan network 20-1 but blocks the other cell.

Figure 11:
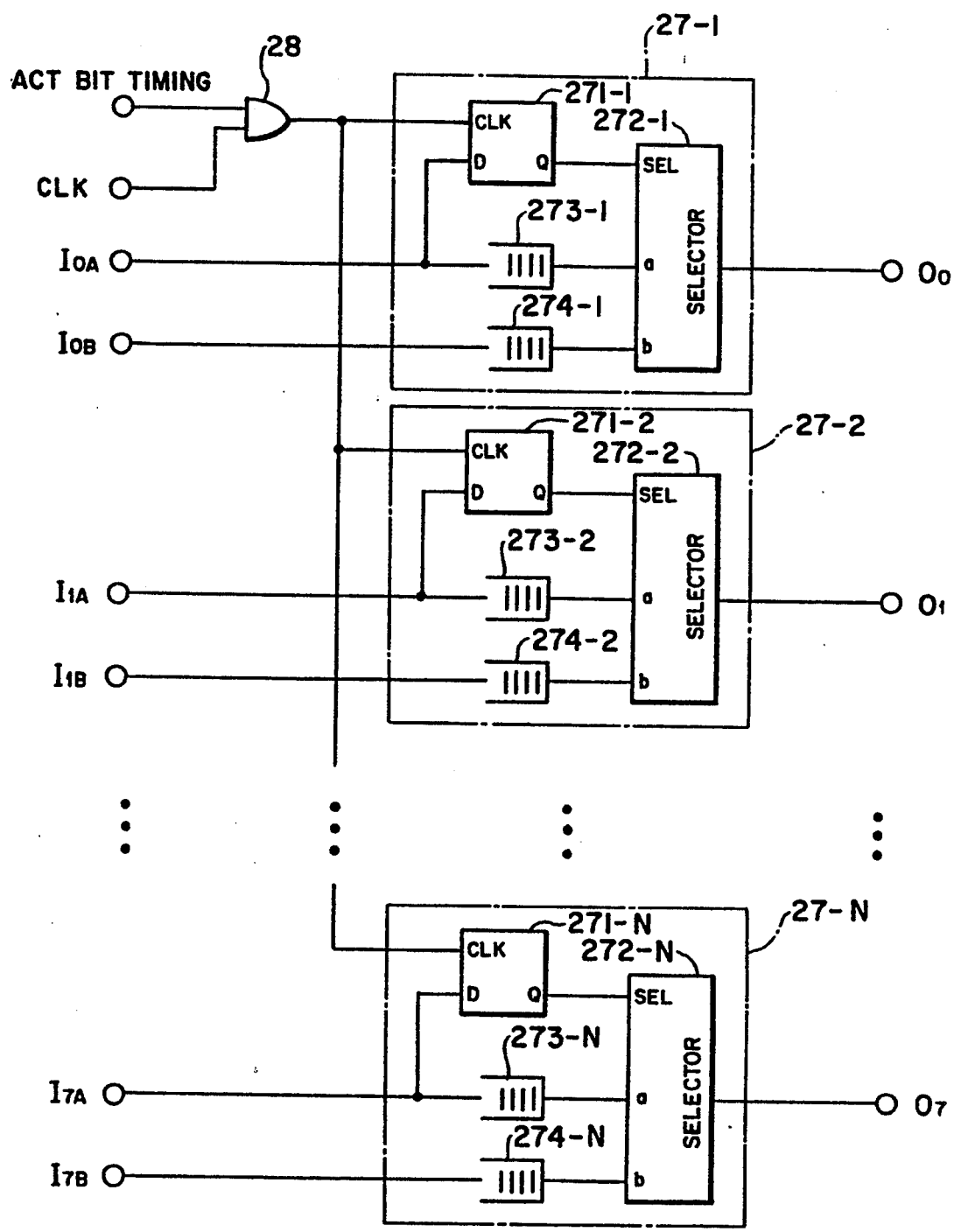
FIG. 11 is a block diagram showing another output interface including arbitration circuits.

In this instance, the arbitration circuits 27-1 to 27-N respectively include, as shown, for example, in FIG. 11, discrimination circuits 271-1 to 271-N for discriminating presence of cells from the particular N/2-input N-output Batcher-banyan network 20-1, selectors 272-1 to 272-N for selecting, based on results of discrimination at the discrimination circuits 271-1 to 271-N, the outputs of the particular N/2-input N-output Batcher-banyan network 20-1 (signals from the output lines $I_0A$ to $I_7A$) when cells from the particular N/2-input N-output Batcher-banyan network 20-1 are present, and buffers 273-1 to 273-N and 274-1 to 274-N, all provided for the individual output lines.

Here, each of the discrimination circuits 271-1 to 271-N is constituted from a D-type flip-flop and receives, at the D-input terminal thereof, a signal from the particular N/2-input N-output Batcher-banyan network 20-1 and at the clock input terminal thereof a logical AND signal (output of an AND gate 28) of a clock signal (refer to the waveform (c) of FIG. 12) and an ACT bit timing signal (refer to the waveform (e) of FIG. 12). The outputs of the discrimination circuits 271-1 to 271-N are inputted to the selectors 272-1 to 272-N, respectively. Consequently, each of the discrimination circuits 271-1 to 271-N latches cell activity bit information in a cell and outputs, when a cell from the particular Batcher-banyan network 20-1 is present, the value "1" to a corresponding one of the selectors 272-1 to 272-N, but outputs, when a cell from the particular Batcher-banyan network 20-1 is not present, the value "0" to the corresponding one of the selectors 272-1 to 272-N.

Each of the selectors 272-1 to 272-N receives at an input terminal a thereof an output of the Batcher-banyan network 20-1 and at another input terminal b thereof another signal from the Batcher-banyan network 20-2, and outputs a signal received at the input terminal a thereof when the selection signal from a corresponding one of the discrimination circuits 271-1 to 271-N is "1" but outputs another signal received at the input terminal b thereof when the selection signal is "0".

Consequently, when two different cells arrive in an overlapping condition at a same output, the selection signal presents the value "1", and accordingly, the outputs from the particular N/2-input N-output Batcher-banyan network 20-1 (signals from the output lines $I_0A$ to $I_7A$) are selected while the other outputs (signals from the output lines $I_0B$ to $I_7B$) are blocked.

With the construction of the interconnection network described above, routing of cells is performed autonomously by the two N/2-input N-output Batcher-banyan networks 20-1 and 20-2 to which different N/2 ones of the N-input lines are coupled.

Such operation will be described subsequently In connection with the Batcher-banyan network 20-1. First, the Batcher sorting network 21-1 effects sorting of cells based destination addresses. As a result, those cells which have an identical destination address are listed successively.

Where the Batcher sorting network 21-1 is such a 4×4 (N=8) Batcher sorting network as shown in FIG. 2, if, as illustrated in FIG. 13, a cell of the address DA=5 is inputted to the input line $I_0$; another cell of the address DA=1 is inputted to the input line $I_1$; a further cell of the address DA=1 is inputted to the input line $I_2$; and a still further cell of the address DA=0 is inputted to the input line $I_3$, then the Batcher sorting network 21-1 sorts the cells in order of the destination addresses beginning with a smallest one. Further, those cells having an identical destination address are listed successively (refer to FIG. 13).

Subsequently, the comparison/blocking circuit 22-1 compares the destination addresses of the individual adjacent cells and leaves only one of the cells, which have an identical destination address, while blocking the other cell or cells. When such blocking processing of a cell or cells has been performed, the list of the sorted cells is discontinuous, and therefore, the cells are subsequently passed through the concentration circuit 23-1, at which they are packed so that the list thereof may be continuous.

For example, proceeding with the description of the example described above, since the addresses DA of the cells at the Bather sorting network 21-1 corresponding to the output lines $O_0$ to $O_3$ are "0", "1", "1" and "5", respectively, the exclusive OR circuits 221 between the input lines $I_0$ and $I_1$ and between the input lines $I_2$ and $I_3$ of the comparison/blocking circuit 22-1 output the value "1" while the exclusive OR circuit 221 between the input lines $I_1$ and $I_2$ outputs "0". Consequently, the selectors 225 for the input lines $I_1$ and $I_3$ maintain the value "1" at the position of each of the cells at which an ACT bit is inserted, but the selector 225 for the input line $I_2$ replaces the value at the position of the cell at which the ACT bit is inserted into "0". As a result, the cells from the output lines $O_0$, $O_1$ and $O_3$ are outputted as active cells, but the cell from the output line $O_2$ is outputted as an inactive cell.

Then, in the concentration circuit 23-1, since, for example, the cells at the input lines $I_1$ and $I_2$ have an identical address as shown in FIG. 15, it is determined that the cell at the input line $I_2$ has been processed for inactivity, and accordingly, while the cells at the input lines $I_0$ and $I_1$ are outputted from the corresponding output lines $O_0$ and $O_1$, respectively, as indicated by thick lines in FIG. 15, the cell at the input line $I_2$ is cut intermediately at one of the selectors 2322 and the cell at the input line $I_3$ is outputted from the output line $O_2$ corresponding to the input line $I_2$. Consequently, the list of the cells is packed to the smaller side of the input line numbers. It is to be noted that an inactive cell is outputted from the output line $O_0$ corresponding to the input line $I_3$.

Thereafter, the row of the cells sorted depending upon the destination addresses and packed into the continuous list in such a manner as described above is inputted to the banyan network 24-1 and outputted to the output lines corresponding to the destinations.

Operation of the banyan network 24-1 when, as continuation to the example described above, the destination address DA of "0" is inputted to the input line $I_0$; the destination address DA of "1" is inputted to the input line $I_1$; the destination address DA of "5" is inputted to the Input line $I_2$; and inactive cells are inputted to the input lines $I_3$ to $I_7$, is illustrated in FIG. 16. It can be seen from FIG. 16 that the continuously listed cells from the concentration circuit 23-1 are outputted to the corresponding output lines $O_0$, $O_1$ and $O_5$, respectively, based on the destination address information thereof.

In the meantime, also the N/2-input N-output Batcher-banyan network 20-2 operates in a similar manner as described above.

In this manner, since the two sets of circuit systems are involved, two output lines are involved corresponding to each destination, and up to two cells having an identical destination address are routed at a time.

The output interface 25 thus connects the paired outputs of the banyan networks 24-1 and 24-2 to, for example, the buffers 26-1 to 26-N to form queues of the cells and outputs the cells to the common output lines.

In this manner, according to the present first embodiment described above, since each of the Batcher sorting networks 21-1 and 21-2 has not N inputs and N outputs but N/2 inputs and N/2 outputs, the number of stages can be decreased by n comparing with that of a conventional N-input N-output Batcher-banyan network. Consequently, the latency by routing processing is reduced by n bit-times comparing with the conventional Batherbanyan network. Further, since up to two cells having an identical destination address can be routed at a time, the cell blocking ratio can be improved by forming queues on the output side of the interconnection network.

It is to be noted that, where arbitration circuits are provided as the output interface 25 for the individual output lines, when two different cells arrive in an overlapping relationship at a same output, one of them is selected while the other is blocked. Particularly where such arbitration circuits 27-1 to 27-N as shown in FIG. 11 are employed, when two different cells arrive in an overlapping relationship at a same output, such processing is performed that the outputs of the particular N/2-input N-output Batcher-banyan network 20-1 are selected while the other outputs are blocked.

b. Second Embodiment

Figure 17:
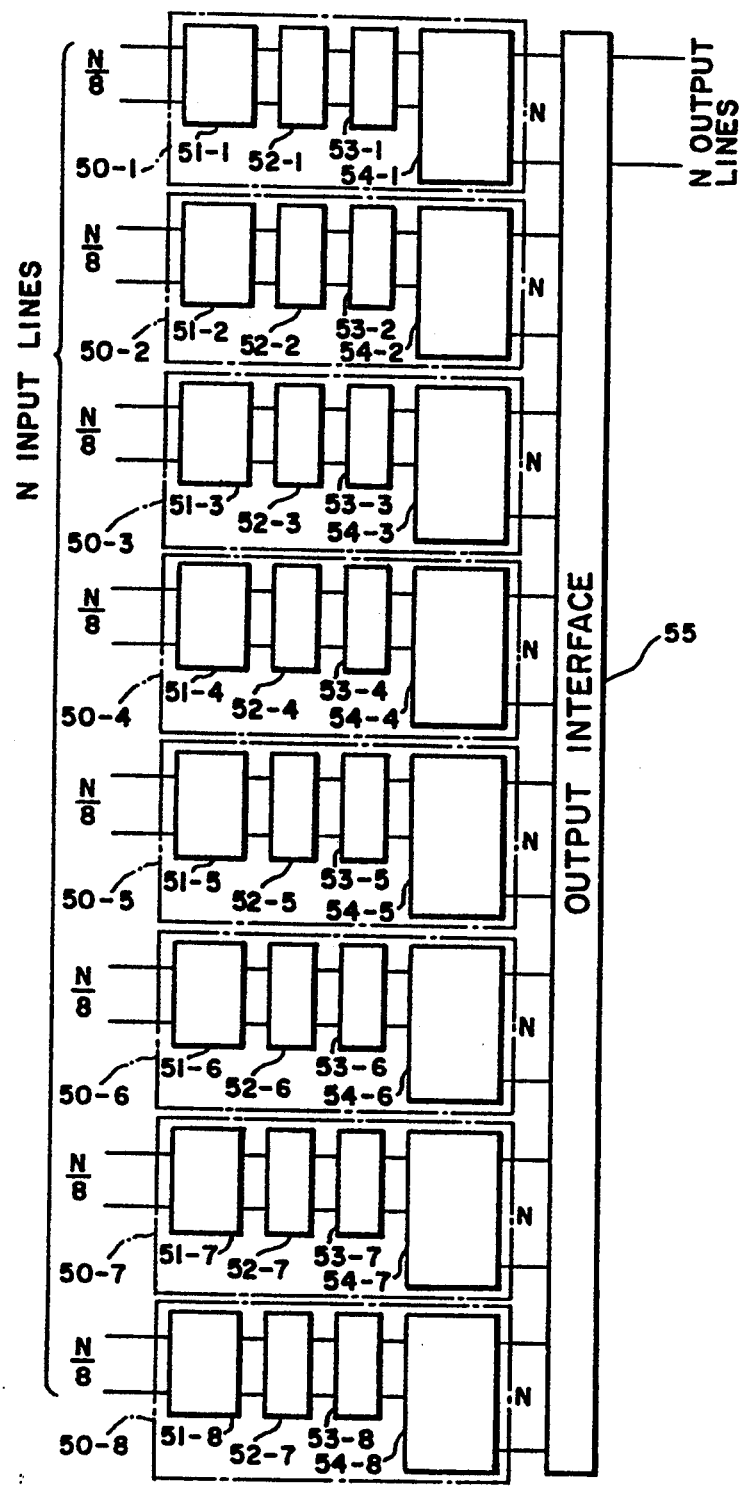
FIG. 17 is a block diagram showing a second preferred embodiment of the present invention.

FIG. 17 shows a second preferred embodiment of the present invention. Referring to FIG. 17, the interconnection network shown includes eight N/8-input N-output Batcher-banyan networks 50-1 to 50-8 which have a self-routing function and are connected in parallel to each other.

Each of the N/8-input N-output Batcher-banyan networks 50-1 to 50-8 includes a Batcher sorting network 51-1 to 51-8 having N/8inputs and N/8outputs, a comparison/blocking circuit 52-1 to 52-8, a concentration circuit 53-1 to 53-8, and a banyan network 54-1 to 54-8 having N inputs and N outputs.

As an example, the components of the N/8-input N-output Batcher-banyan network 50-1 will be described.

First, the Batcher sorting network 51-1 is constituted from $(n-3)(n-2)/2$ stages and effects sorting of cells. Also the Batcher sorting network 51-1 includes a plurality of $2 \times 2$ switching elements at each stage thereof similarly as in the first embodiment described hereinabove.

The comparison/blocking circuit 52-1 compares the addresses of cells sorted by the Batcher sorting network 51-1 and leaves, when different cells have an identical address, only one of them while blocking the remaining cell or cells. Also the present comparison/blocking circuit 52-1 includes exclusive OR circuits, OR gates, latch circuits. AND gates, selectors and so forth between individual adjacent input lines in order to effect comparing and block processing between the adjacent input lines similarly as in the, first embodiment described hereinabove.

The concentration circuit 53-1 compensates for a cell or cells blocked by the comparison/blocking circuit 52-1 to pack the cells so that the list of them may be continuous. To this end, also the present concentration circuit 53-1 includes, similarly as in the first embodiment described hereinabove, a discrimination circuit for discriminating whether cells inputted thereto by way of the comparison/blocking circuit 52-1 are active or inactive, and a cell packing circuit for packing, based on a result of discrimination at the discrimination circuit, the cells so that the list thereof may be continuous.

The banyan network 54-1 outputs listed cells from the concentration circuit 53-1 to corresponding output lines based on destination address information of the cells. Also the banyan network 54-1 includes a plurality of $2 \times 2$ switching elements at each stage thereof similarly as in the first embodiment described hereinabove.

It is to be noted that the N/8 outputs of the concentration circuit 53-1 are Inputted as part of the N inputs of the banyan network 54-1 beginning with an end one of the N input in a row, and the other inputs of the banyan network 54-1 remain in an unconnected condition.

Also the Batcher sorting networks 51-2 to 51-8, the comparison/blocking circuits 52-2 to 52-8, the concentration circuits 53-2 to 53-8 and the banyan networks 54-2 to 54-8 of the other N/8-input N-output Batcher-banyan networks 50-2 to 50-8 are constructed and operate similarly to the Batcher sorting network 51-1, the comparison/blocking circuit 52-1, the concentration circuit 53-1 and the banyan network 54-1 of the N/8-input N-output Batcher-banyan network 50-1 described hereinabove, respectively.

Figure 18:
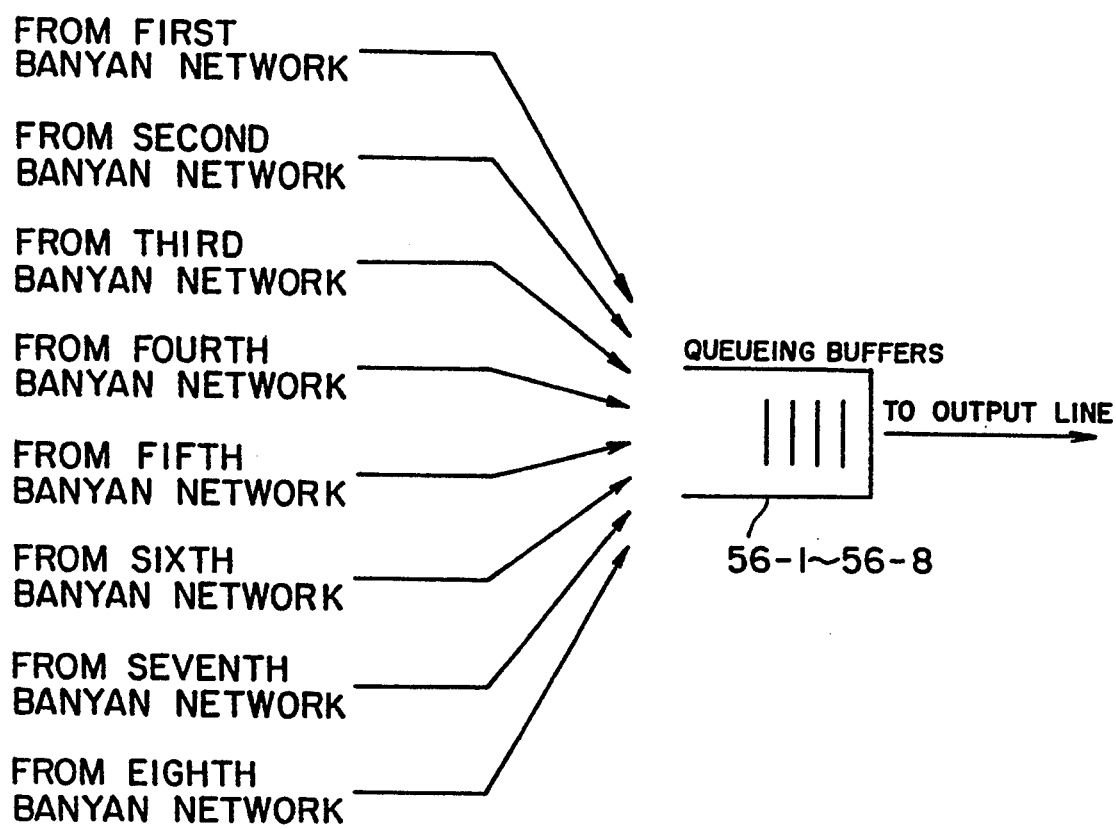
FIG. 18 is a block diagram showing an output interface of the Batcher-banyan network of FIG. 17.

The output interface 55 inputs the individual N outputs of the N/8-input N-output Batcher-banyan networks 50-1 to 50-8 and outputs N outputs. The output interface 55 includes queueing buffers 56-1 to 56-8 (refer to FIG. 18) provided for the individual output lines each for receiving one output from each of the N/8-input N-output Batcher-banyan networks 50-1 to 50-8. The output interface 55 may otherwise include such arbitration circuits provided for the individual output lines which each receives one output from each of the N/8-input N-output Batcher-banyan networks 50-1 to 50-8 and selects, when different cells arrive in an overlapping relationship at a same output, one of the cells while blocking the other cell or cells.

The arbitration circuits in this instance are constructed as arbitration circuits which each receives one output from each of the N/8-input N-output Batcher-banyan networks 50-1 to 50-8 and selects, when different cells arrive in an overlapping relationship at an identical output, the output of a particular one of the N/8-input N-output Batcher-banyan networks (for example, the N/8-input N-output Batcher-banyan network 50-1) while blocking the output or outputs of the other N/8-input N-output Batcher-banyan network or networks.

In this instance, each of the arbitration circuits includes, for each of the output lines, a discrimination circuit for discriminating presence of a cell from a particular one of the N/8-input N-output Batcher-banyan networks, and a selector for preferentially selecting, based on a result of discrimination at the discrimination circuit, the output of the particular N/8-input N-output Batcher-banyan network when a cell from the particular N/8-input N-output Batcher-banyan network is present, similarly as in the first embodiment described hereinabove.

Due to the construction described above, the N input lines are divided into 8 groups, and the different N/8 inputs are inputted to the N/8-input N-output Batcher-banyan networks 50-1 to 50-8. Each of the N/8-input N-output Batcher-banyan networks 50-1 to 50-8 operates in the following manner (operation of the N/8-input N-output Batcher-banyan network 50-1 will be described as an example).

First, cells inputted are sorted based on destination address information thereof by the Batcher sorting network 51-1. Consequently, those cells having an identical destination address are listed continuously. The addresses of the cells are compared at the comparison/blocking circuit 52-1, and only one of those cells which have an identical address is left while the other cell or cells are blocked. When blocking processing of a cell or cells is performed in this manner, since the list of the cells is discontinuous, the cells are passed through the concentration circuit 53-1 so that they are packed to make the list of the cells continuous. The row of the cells sorted based on the destination addresses and packed into the continuous list in this manner is inputted to the banyan network 54-1, and consequently, the cells are outputted to the output lines corresponding to the destination addresses.

The individual N outputs of the N/8-input N-output Batcher-banyan networks 50-1 to 50-8 are inputted to the output interface 55, in which they are received at the queueing buffers 56 or the arbitration circuits provided for the output lines of the output interface 55. Consequently, the output interface 55 outputs N outputs therefrom.

As described so far, according to the present second embodiment, since the numbers of the inputs and the outputs of the Batcher sorting networks 51-1 to 51-8 are reduced from N to N/8, the number of stages can be reduced by $3n-3$, and accordingly, the latency by routing processing can be reduced by $3n-3$ bit-times comparing with that of a conventional Batcher-banyan network. Further, since up to eight cells having an identical destination address can be routed at a time, the cell blocking ratio can be improved by forming queues on the output side of the networks.

c. Others

Figure 19:
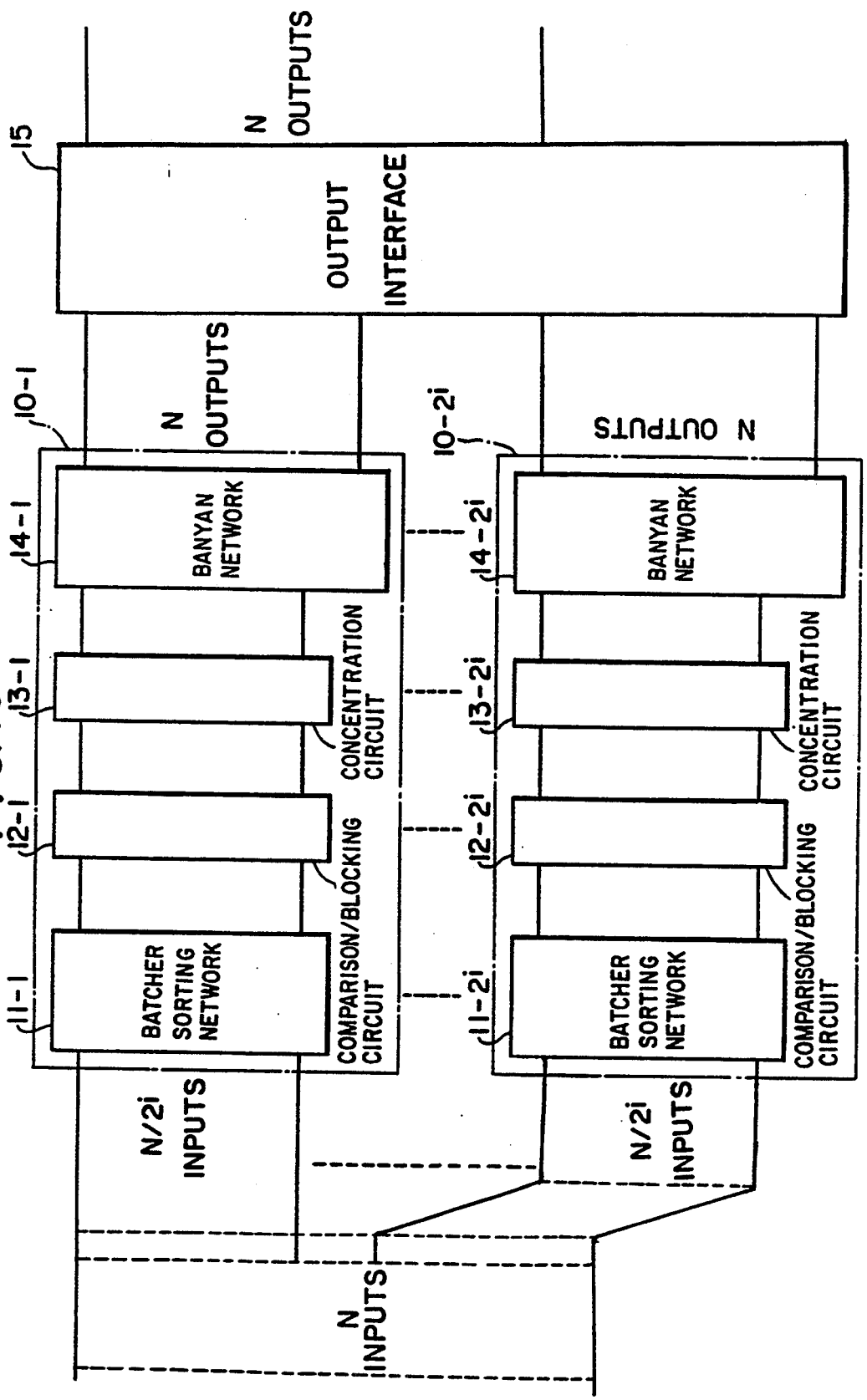
FIG. 19 is a block diagram showing a third preferred embodiment of the present invention.
Figure 20:
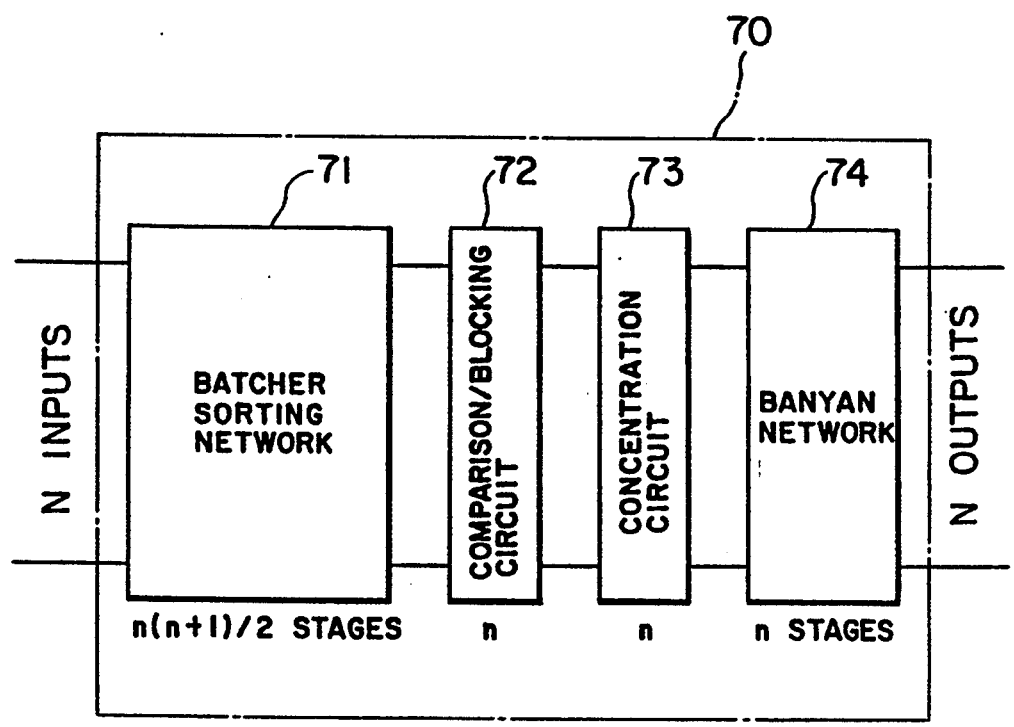
FIG. 20 is a block diagram showing detailed construction of a typical interconnection network.

Referring now to FIG. 19, an interconnection network with a self-routing function according to the present invention is shown in a fully generalized representation. The interconnection network shown includes $2^i$ (i is a natural number) $N/2^i$-input N-output Batcher-banyan networks 10-1 to 10-$2^i$ connected in parallel to each other and each including a Batcher sorting network 11-1 to 11-$2^i$ having $N/2^i$ inputs and $N/2^i$ outputs, a comparison/blocking circuit 12-1 to 12-2', a concentration circuit 13-1 to 13-2', and a banyan network 14-1 to 14-$2^i$ having N inputs and N outputs. In this instance, in each of the $N/2^i$-input N-output Batcher-banyan networks 10-2', the $N/2^i$ outputs of the concentration circuit 13-1 to 13-$2^i$ are inputted as part of the N inputs of the banyan network 14-1 to 14-$2^i$ similarly as described hereinabove while the other inputs of the banyan network 14-1 to 14-$2^i$ remain in an unconnected condition.

The interconnection network further includes an output interface 15 which inputs the individual N outputs of the $N/2^i$-input N-output Batcher-banyan networks 10-$2^i$ and outputs N outputs. The output interface 15 either includes, for the individual output lines, queueing buffer circuits for receiving the N outputs of the $N/2^i$-input N-output Batcher-banyan networks 10-1 to 10-$2^i$ or includes, for the individual output lines, arbitration circuits which receive the individual N outputs of the N/2 1-input N-output Batcher-banyan networks 10-1 to 10-$2^i$ and select, when different cells arrive in an overlapping relationship at a same output, one of the cells while blocking the other cell or cells (in this instance, each of the arbitration circuits is constructed so that, for example, when different cells arrive in an overlapping relationship at a same output, it selects the output of a particular one of the Batcher-banyan networks while blocking the other output or outputs).

Consequently, with the present interconnection network with a self-routing function, the N input lines are divided by $N/2^i$ inputs, and the different $N/2^i$ inputs are inputted to the $N/2^i$-input N-output Batcher-banyan networks 10-1 to 10-2'. Each of the $N/2^i$-input N-output Batcher-banyan networks 10-1 to 10-$2^i$ operates in the following manner.

Describing operation of the $N/2^i$-input N-output Batcher-banyan network 10-1 as an example, cells inputted are first sorted based on destination address information thereof by the Batcher sorting network 11-1. In this instance, different cells having an identical destination address are listed continuously. The addresses of the cells are compared at the comparison/blocking circuit 12-1, and only one of those cells having an identical address is left while the remaining cell or cells is blocked. When such blocking of a cell or cells is performed, the list of the cells is discontinuous, and accordingly, the cells are passed through the concentration circuit 13-1 so that they are packed to make the list of the cells continuous. The row of the cells sorted based on the destination addresses and packed into the continuous list in this manner are inputted to the banyan network 14-1, from which the cells are outputted to the output lines corresponding to the destination addresses.

The individual N outputs of the $N/2^i$-input N-output Batcher-banyan networks 10-1 to $10\text{-}2^i$ are inputted to the output interface 15, from which N outputs are outputted. It is to be noted that the individual N outputs of the $N/2^i$-input N-output Batcher-banyan networks 10-1 to $10\text{-}2^i$ are received at the queueing buffer circuits or at the arbitration circuits provided for the individual output lines of the output interface 15 so that N outputs are outputted from the output interface 15.

Consequently, also in this instance, substantially similar effects or advantages to those of the first and second embodiments described hereinabove are achieved.

The present invention is not limited to the specifically described embodiment, and variations and modifications may be made without departing from the scope of the present invention.

What is claimed is:

1. An interconnection network with a self-routing function which has N input lines and N output lines, N being a natural number equal to $2^n$, n being a natural number, and effects autonomous routing of a cell, which is an information communication unit, based on destination address information of the cell, comprising:

$2^i$ $N/2^i$-input N-output Batcher-banyan networks connected in parallel to each other, i being a natural number, each of said $N/2^i$-input N-output Batcher-banyan networks including:

a Batcher sorting network having $N/2^i$ inputs and $N/2^i$ outputs and including $(n-i)$ $(n+1-i)/2$ stages for sorting input cells, n being equal to $\log_2 N$;

comparison/blocking means having $N/2^i$ inputs and $N/2^i$ outputs for comparing destination addresses of the cells sorted by said Batcher sorting network and leaving only those cells which have an identical address while blocking the remaining one or ones of the cells;

concentration means having $N/2^i$ inputs and $N/2^i$ outputs for cutting the cell or cells blocked by said comparison/blocking means to pack the cells into a list of continuous cells; and a banyan network coupled to said concentration means and having N inputs and N outputs for outputting the cells outputted from said concentrating means to the corresponding output lines based on the destination address information of the cells, said $N/2^i$ outputs of said concentration means being connected to only a part of successive inputs of said N inputs of said banyan network.

2. An interconnection network with a self-routing function as claimed in claim 1, wherein said comparison/blocking means includes comparing means for comparing destination addresses of adjacent input cells and determining which cells have an identical address, and blocking means for blocking said cells except the cells which have an identical address as determined by said comparison means.

3. An interconnection network with a self-routing function as claimed in claim 2, wherein said input cells are active or inactive depending on whether an ACT bit defined in a cell format is "1" to "0", and said ACT bit being inserted in a bit next to a destination address of an input cell, and wherein said blocking means effects blocking processing by making a cell activity bit or bits in the remaining cell or cells except the cell which is inactive.

4. An interconnection network with a self-routing function as claimed in claim 3, wherein said blocking means includes a latch circuit for latching a result of comparison from said comparing means, a gate circuit for receiving an output of said latch circuit and an input cell and outputting cell activity bit information or cell inactivity bit information, and a selector for inserting an output of said gate circuit into the cell at a timing of a position in the cell at which the cell activity bit is inserted.

5. An interconnection network with a self-routing function as claimed in claim 1, wherein said concentration means includes discrimination means for discriminating whether a cell inputted thereto by said comparison/blocking means is active or inactive, and cell packing means for packing the cells, based on a result of discrimination in said discrimination means into a list of the cells which is continuous.

6. An interconnection network with a self-routing function as claimed in claim 5, wherein said discrimination means includes a latch circuit for latching cell activity bit information in the cell, and said cell packing means includes a set of selectors for packing the cells, based on a result of discrimination from said latch circuit.

7. An interconnection network with a self-routing function which has N input lines and N output lines, N being a natural number equal to $2^n$, n being a natural number, and effects autonomous routing of a cell, which is an information communication unit, based on destination address information of the cell, comprising:

$2^i$-$N/2^i$-input N-output Batcher-banyan networks connected in parallel to each other, i being a natural number, each of said $N/2^i$-input N-output Batcher-banyan networks including:

a Batcher sorting network having $N/2^i$ inputs and outputs and including $(n-i)$ $(n+1-i)/2$ stages for Sorting input cells, n being equal to $\log_2 N$;

comparison/blocking means having $N/2^i$ inputs and $N/2^i$ outputs for comparing destination addresses of the cells sorted by said Batcher sorting network and leaving only those cells which have an identical address while blocking the remaining one or ones of the cells;

concentration means having $N/2^i$ inputs and $N/2^i$ outputs for cutting the cell or cells blocked by said comparison/blocking means to pack the cells into a list of continuous cells; and a banyan network coupled to said concentration means and having N inputs and N outputs for outputting the cells outputted from said concentrating means to the corresponding output lines based on the destination address information of the cells, wherein said $N/2^i$ outputs of said concentration means being of each of said $N/2^i$-input N-output Batcher-banyan networks are inputted as part of the N inputs of said banyan network successively in order beginning with an end input of said N inputs, and the remaining inputs of said banyan network remain in an unconnected condition.

8. An interconnection network with a self-routing function which has N input lines and N output lines, N being a natural number equal to $2^n$, n being a natural number, and effects autonomous routing of a cell, which is an information communication unit, based on destination address information of the cell, comprising:

$2^i$ $N/2^i$-input N-output Batcher-banyan networks connected in parallel to each other, i being a natural number, each of said $N/2^i$-input N-output Batcher-banyan networks including:

a Batcher sorting network having $N/2^i$ inputs and $N/2^i$ outputs and including $(n-i)(n+1-i)/2$ stages for sorting input cells, n being equal to $\log_2 N$;

comparison/blocking means having $N/2^i$ inputs and $N/2^i$ outputs for comparing destination addresses of the cells sorted by said Batcher sorting network and leaving only those cells which have an identical address while blocking the remaining one or ones of the cells;

concentration means having $N/2^i$ inputs and $N/2^i$ outputs for cutting the cell or cells blocked by said comparison/blocking means to pack the cells into a list of continuous cells; and a banyan network coupled to said concentration means and having N inputs and N outputs for outputting the cells outputted from said concentrating means to the corresponding output lines based on the destination address information of the cells, said $N/2^i$ outputs of said concentration means being connected to only a part of successive inputs of said N inputs of said banyan network; and the network, further comprising an output interface for inputting the individual N outputs of said $N/2^i$-input N-output Batcher-banyan networks and outputting N outputs, wherein said output interface includes queueing buffer circuits provided for the output lines thereof for receiving the individual N outputs of said $N/2^i$-input N-output Batcher-banyan networks.

9. An interconnection network with a self-routing function as claimed in claim 8, wherein said output interface includes arbitration means provided individually for the output lines thereof for receiving the individual N outputs of said $N/2^i$-input N-output Batcher-banyan networks and selecting, when different cells arrive in an overlapping relationship at the arbitration means, one of the cells while block the other cell or cells.

10. An interconnection network with a self-routing function as claimed in claim 9, wherein said arbitration means are individually constructed such that they receive the individual N outputs of said $N/2^i$-input N-output Batcher-banyan networks and select, when different cells arrive in an overlapping relationship at the arbitration means, the output of a particular one of said $N/2^i$-input N-output Batcher-banyan networks while blocking the other output or outputs, and wherein said arbitration means include discrimination means for discriminating presence of a cell from a specific $N/2^i$-input N-output Batcher-banyan network, and a selector for preferentially selecting, when a cell from said specific $N/2^i$-input N-output Batcher-banyan network is present based on a result of discrimination at said discrimination means, the output of said specific $N/2^i$-input N-output Batcher-banyan network.

11. An interconnection network with a self-routing function which has N input lines and N output lines, N being a natural number equal to $2^n$, n being a natural number, and effects autonomous routing of a cell, which is an information communication unit, based on destination address information of the cell, comprising:

$2^i$ $N/2^i$-input N-output Batcher-banyan networks connected in parallel to each other, i being a natural number, each of said $N/2^i$-input N-output Batcher-banyan networks including:

a Batcher sorting network having $N/2^i$ inputs and $N/2^i$ outputs and including $(n-i)(n+1-i)/2$ stages for sorting input cells, n being equal to $\log_2 N$;

comparison/blocking means having $N/2^i$ inputs and $N/2^i$ outputs for comparing destination addresses of the cells sorted by said Batcher sorting network and leaving only one of those cells which have an identical address while blocking the remaining one or ones of the cells;

concentration means having $N/2^i$ inputs and $N/2^i$ outputs for cutting the cell or cells blocked by said comparison/blocking means to pack the cells into a list of continuous cells; and a banyan network coupled to said concentration means and having N inputs and N outputs for outputting the cells outputted from said concentrating means to the corresponding output lines based on the destination address information of the cells, said $N/2^i$ outputs of said concentration means being connected to only a part of successive inputs of said N inputs of said banyan network; and buffer means coupled to each of banyan networks of said $N/2^i$-input N-output Batcher-banyan networks for inputting the individual N outputs thereof and provided at an output side of the network.

* * * * *